(12) United States Patent
Cheung

(10) Patent No.: US 10,660,348 B2
(45) Date of Patent: May 26, 2020

(54) APPLIANCE HAVING AN AUGER AND CONTIGUOUS EVAPORATOR COMPARTMENTS FOR MAKING FROZEN FOOD PRODUCTS

(71) Applicant: Hang Shun Hing Company Limited, Kwun Tong, Kowloon Hong Kong (CN)

(72) Inventor: Man Fai Cheung, Hong Kong (CN)

(73) Assignee: Hang Shun Hing Company Limited, Hong Kong (CN)

( * ) Notice: Subject to any disclaimer, the term of this patent is extended or adjusted under 35 U.S.C. 154(b) by 86 days.

(21) Appl. No.: 16/005,932

(22) Filed: Jun. 12, 2018

(65) Prior Publication Data

US 2018/0352830 A1    Dec. 13, 2018

(30) Foreign Application Priority Data

Jun. 13, 2017    (HK) .................................. 17105853

(51) Int. Cl.
*A23G 9/22* (2006.01)
*A23G 9/12* (2006.01)
(Continued)

(52) U.S. Cl.
CPC .............. *A23G 9/12* (2013.01); *A23G 9/222* (2013.01); *A23G 9/224* (2013.01); *A23G 9/228* (2013.01);
(Continued)

(58) Field of Classification Search
CPC .......... A23G 9/12; A23G 9/222; A23G 9/224; A23G 9/228; A23G 9/281; F25C 1/147; F25C 5/02; F25C 2700/10
See application file for complete search history.

(56) References Cited

U.S. PATENT DOCUMENTS 3,371,505 A * 3/1968 Raver ..................... F25C 1/147
                                                          62/320
3,769,809 A * 11/1973 Robinson ................ F25C 1/147
                                                          62/137
(Continued)

FOREIGN PATENT DOCUMENTS

CN        2480783 Y  *  3/2002
CN        2480783 Y     3/2002
CN      205232945 U     5/2016

OTHER PUBLICATIONS

SIPO Republic of China Search Report for Hong Kong Short-Term Patent Application No. 17105853.6, dated Sep. 12, 2017.

*Primary Examiner* — Frantz F Jules
*Assistant Examiner* — Lionel Nouketcha
(74) *Attorney, Agent, or Firm* — Leydig, Voit & Mayer, Ltd.

(57) ABSTRACT

An appliance for producing frozen food products, such as ice cream or slush drinks, includes a cooling cylinder connected in a refrigeration circuit, the cooling cylinder including a thermally-conductive cylinder wall and end cap closing the distal end of the cylinder wall, the cylinder wall and end cap separating refrigerant on one side from product to be frozen on the other side. A divider member disposed adjacent the cylinder wall forms contiguous evaporator compartments spaced apart axially. Restrictor passages in the divider member permit communication between contiguous compartments and refrigerant first enters the first-cooled evaporator compartment at one of the axial ends and flows in series between the evaporator compartments. For fast, efficient freezing of small batches, the product to be frozen is either driven by the auger, or drains, toward the first-cooled evaporator compartment.

20 Claims, 3 Drawing Sheets

(51) Int. Cl.
  *A23G 9/28* (2006.01)
  *F25C 1/147* (2018.01)
  *F25C 5/02* (2006.01)

(52) U.S. Cl.
  CPC .............. *A23G 9/281* (2013.01); *F25C 1/147* (2013.01); *F25C 5/02* (2013.01); *F25C 2700/10* (2013.01)

(56) References Cited

U.S. PATENT DOCUMENTS

| | | |
|---|---|---|
| 9,326,530 B2 | 5/2016 | Ugolini |
| 9,326,531 B1 | 5/2016 | Reich et al. |
| 9,591,871 B2 | 3/2017 | Ugolini |
| 2005/0193759 A1* | 9/2005 | Brunner .................. F25C 1/145 62/354 |
| 2011/0023519 A1 | 2/2011 | Dong |
| 2012/0055189 A1* | 3/2012 | Sipp ....................... A23G 9/045 62/342 |
| 2014/0332560 A1 | 11/2014 | Sipp et al. |

* cited by examiner

APPLIANCE HAVING AN AUGER AND CONTIGUOUS EVAPORATOR COMPARTMENTS FOR MAKING FROZEN FOOD PRODUCTS

TECHNICAL FIELD

The present invention relates to an appliance for making frozen food products, such as ice cream or slush drinks, of the type comprising a cooling cylinder adjacent which a motor-driven auger rotates.

BACKGROUND OF THE INVENTION

Countertop machines of this type vary from hand cranked units used to make homemade ice cream to high capacity freezers used by restaurants and bars. In the latter, a cooling cylinder is typically held in a tank for the product, and ice crystals formed on the heat-conductive outer wall of the cooling cylinder are scraped off by the auger. The cooling cylinder is the evaporator of a vapour-compression refrigeration circuit which typically further includes a compressor, a condenser and a restriction device. The restriction device controls refrigerant flow and releases the pressure between the high-pressure condensation side and the low-pressure evaporation side and is most commonly a capillary tube.

Domestic appliances for producing frozen food products, unlike the commercially used versions, are not maintained at operating temperature and so, typically, for each batch it is necessary to reduce the temperature of not just the product to be frozen, but also of the cooling cylinder, from ambient temperature. It will therefore be understood that there is a need to achieve a short freezing time, following start-up, with a small refrigeration capacity. Moreover, manufacturers also must consider the need to most cost-effectively produce a range of models, such as a small-footprint model suitable to making two or three servings at one time, to larger capacity machines suitable for a family.

Perhaps the most common cooling cylinder has a cylindrical wall scraped by the auger and on the inside of which is a helical tube coil carrying the refrigerant. Following start-up, the large liquid component of the refrigerant rapidly evaporates on meeting the room-temperature evaporator coil, producing a complex two-phase flow through the coil. As more refrigerant is introduced, the liquid component is distributed throughout the greatest part of the length of the coil, as the vapour flow is able to push along slugs of liquid, as well as pass through an annular film of liquid refrigerant wetting the walls of the coils. Since most heat transfer occurs when the liquid refrigerant is changed to vapour, there is a drop in heat transfer toward the outlet of the coil, but the wide distribution of the liquid component along the coil tends to fairly evenly distribute the heat transfer. On the one hand, even distribution of the heat transfer increases efficiency when operating at capacity, but may reduce efficiency when a small batch, such as a single serving is made.

It is an object of the present invention to overcome or substantially ameliorate the above disadvantages or, more generally, to provide an improved auger-type ice maker appliance.

DISCLOSURE OF THE INVENTION

According to one aspect of the present invention there is provided an appliance for producing frozen food products comprising:

a cooling cylinder connected in a refrigeration circuit, the cooling cylinder having an axis, a proximal end and an opposing distal end, the cooling cylinder including a cylinder wall and end cap, the end cap closing the distal end of the cylinder wall, the cylinder wall and end cap being thermally-conductive and separating refrigerant on one side from product to be frozen on the other side;

a dispenser assembly adjacent one of the proximal and distal ends for dispensing the product;

an auger disposed adjacent the one side of the cylinder wall to turn about the axis and scrape frozen product from the cooling cylinder;

an electric motor for rotating the auger;

a main controller that controls actuation of the electric motor and, for dispensing, drives the auger to impel the product toward the dispenser assembly;

a divider member disposed adjacent the other side of the cylinder wall for forming contiguous evaporator compartments, the evaporator compartments being spaced apart axially by transversely extending parts of the divider member disposed in sealing engagement with the cylinder wall;

restrictor passages in the divider member to permit communication between contiguous compartments, and refrigerant ports in the evaporator compartments at the proximal and distal ends of the divider member, whereby refrigerant first enters the evaporator compartment at one of the proximal and distal ends and flows in series between the evaporator compartments.

Preferably the appliance further comprises a bowl for holding the product, the cooling cylinder projecting into the bowl, and the cylinder wall and end cap are outermost. Alternatively, the cylinder wall and end cap may be innermost and the product held inside the cylinder wall and end cap.

Preferably the restrictor passages extend substantially axially through the transversely extending parts and the refrigerant inlet and outlet of each evaporator compartment are staggered transversely from one another. Preferably, in intermediate ones of the evaporator compartments between the evaporator compartments at the proximal and distal ends, the transversely extending parts bound axially opposing ends of each of the intermediate evaporator compartments, and the restrictor passages in inlet and outlet sides of each evaporator compartment are diametrically opposing.

Preferably the divider further comprises an elongate core from which the transversely extending parts project outward, the core being continuous and wherein one of refrigerant ports is an axially elongated and extends through the core to connect the evaporator compartment adjacent the end cap to a proximal end of the cooling cylinder for refrigerant supply or return.

In one embodiment, the distal end is adjacent the dispenser assembly, the axis is substantially horizontal or inclined such that the distal end is lowermost, and at start-up of the appliance the main controller turns the auger to urge the product toward the distal end, and the evaporator compartment at the distal end is first filled with liquid refrigerant. In this embodiment the one of refrigerant ports that is an axially elongated provides an inlet and refrigerant is pre-cooled therein.

In another embodiment, the proximal end is adjacent the dispenser assembly, the axis is substantially upright, the proximal end is lowermost and the evaporator compartment at the proximal end is first filled with liquid refrigerant.

Preferably a ratio of the volume of a second of the evaporator compartments to the volume of the evaporator compartment at the first end is between 1.3 and 1.7. More preferably, the ratio of the volume of the second evaporator compartment to the volume of the evaporator compartment at the first end is about 1.5.

Preferably the cross-sectional area of the throttling passage is between 80% and 120% of the cross-sectional area of the refrigerant port at the outlet of the cooling cylinder.

In another aspect the invention provides an appliance for producing frozen food products comprising:

a bowl for holding the product to be frozen a cooling cylinder connected in a refrigeration circuit, the cooling cylinder having an axis, a proximal end and an opposing distal end, the cooling cylinder including a cylinder wall and end cap, the end cap closing the distal end of the cylinder wall, the cylinder wall and end cap being thermally-conductive and separating refrigerant on one side from product to be frozen on the other side;

a dispenser assembly adjacent one of the proximal and distal ends for dispensing the product;

an auger disposed adjacent the one side of the cylinder wall to turn about the axis and scrape frozen product from the cooling cylinder;

an electric motor for rotating the auger;

a main controller that controls actuation of the electric motor and, for dispensing, drives the auger to impel the product toward the dispenser assembly;

wherein the bowl includes a lowermost section of part-cylindrical form complementary to the auger and subtended by an angle of between 60° and 120° and opposite edges of the lowermost section are joined to planar sidewall sections that extend tangentially to define a product-receiving space alongside both sides of the auger.

This invention provides an appliance for producing frozen food products which is effective and efficient in operational use, and which by its essentially modular construction allows different models of appliance be economically constructed.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 1:
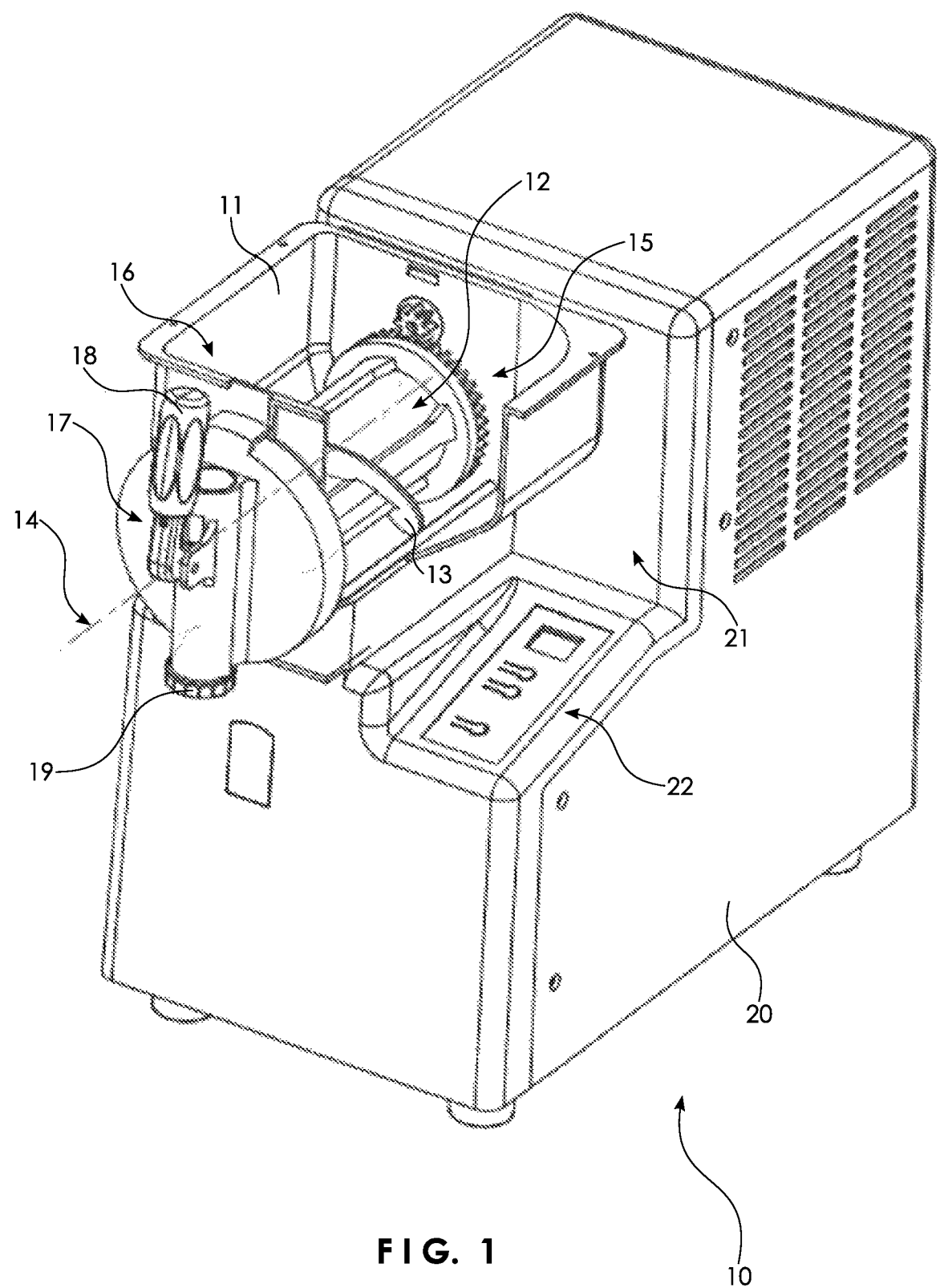
FIG. 1 is a perspective view of a first embodiment of an appliance for producing frozen food products according to the invention.

Referring to FIG. 1, a countertop appliance 10 for producing frozen food products is illustrated, and includes an open-topped bowl 11 for holding the product to be frozen. The bowl 11 is shown partially cut away (at its front and right hand side) to better reveal the cooling cylinder 12 and auger 13 therein.

Figure 2:
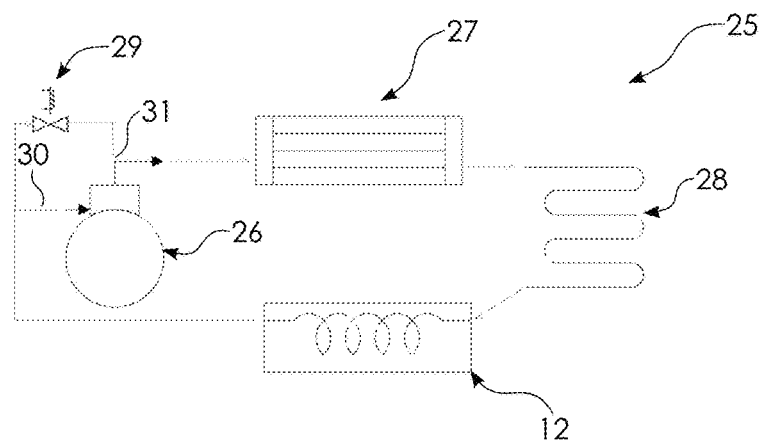
FIG. 2 is a schematic drawing of the refrigeration circuit of the appliance.

The cooling cylinder 12 is an assembly with an axis 14 (disposed horizontally in the illustrated embodiment). As used herein, the term "axial" refers to a direction substantially parallel to the axis 14. The term "radial" refers to a direction substantially orthogonal to the axis 14. The term "circumferential" refers to the direction of a circular arc having a radius substantially orthogonal to the axis 14. The cooling cylinder 12 has a cantilevered type construction, with a fixed proximal end 15 and an opposing free end 16. The fixed proximal end 15 may be innermost and the free end 16 outermost, adjacent the dispensing assembly 17. In a variation (not shown) of the appliance 10 of FIGS. 1 to 3 the axis 14 may be inclined to the horizontal up to about 20°, with the dispensing assembly 17 lowermost.

The dispensing assembly 17 may comprise a valve (not shown) in fluid communication with the inside of the bowl 11, a handle 18 and a downwardly opening nozzle 19.

The appliance 10 may have a housing 20 of generally rectangular prismatic form, along a transverse edge of which a recess 21 is formed to receive the bowl 11. A main controller (not shown) is connected to a control panel 22 on a bottom side of the recess 21, the control panel 22 providing control switches and a status display. The housing 20 encloses the refrigeration circuit 25 shown in FIG. 2.

The refrigeration circuit 25 includes a compressor 26, a condenser 27, a restriction device 28 (such as a capillary tube) as well as the cooling cylinder 12 (or evaporator). The circuit 25 further comprises a solenoid-operated pressure equalization valve 29 connected across the compressor 26, i.e. connecting the compressor suction 30 to the discharge 31. The valve 29 is opened by the main controller to permit rapid compressor start.

Figure 3:
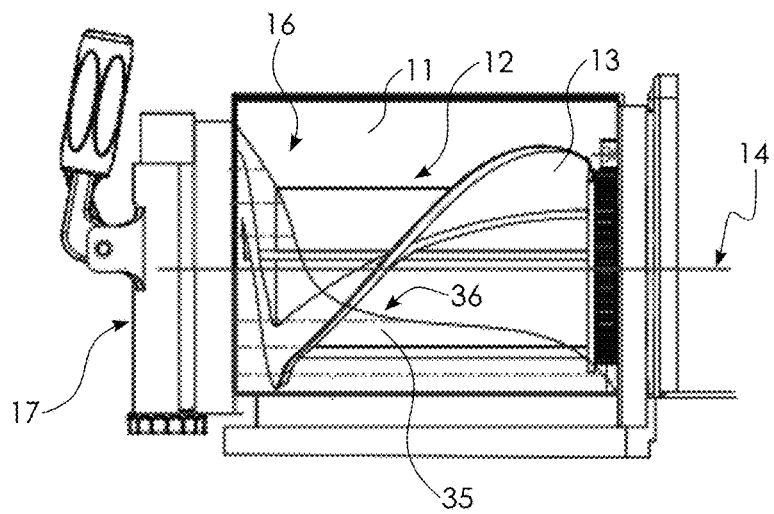
FIG. 3 is a side view of the bowl of the appliance of FIG. 1.
Figure 4:
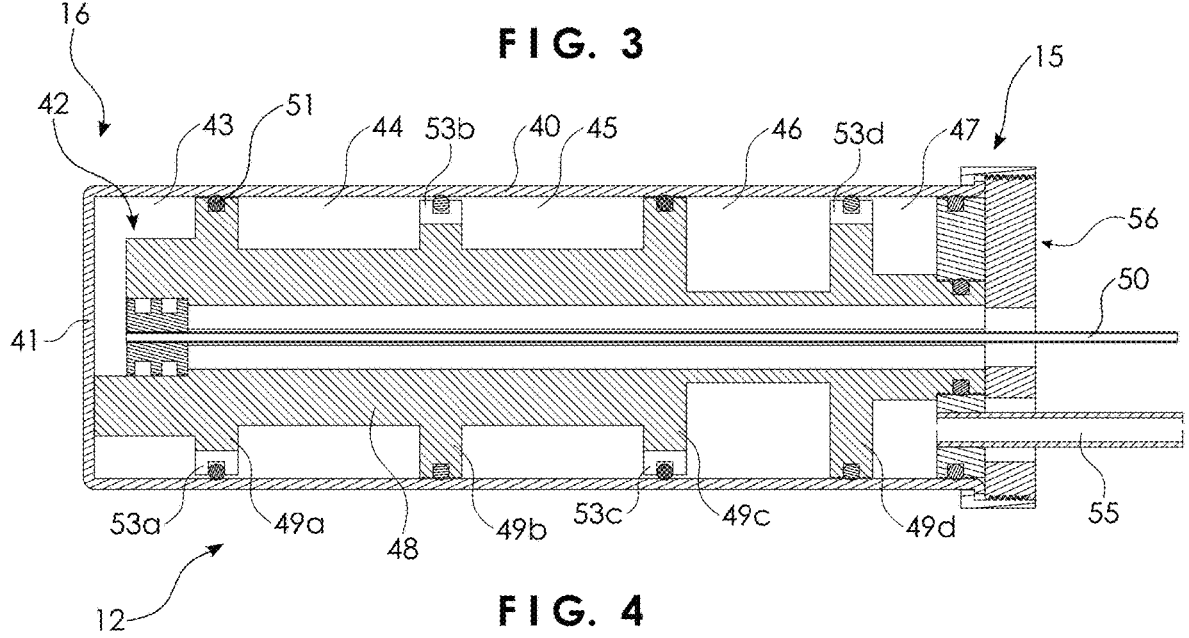
FIG. 4 is a longitudinal section through the cooling cylinder of the appliance.

Referring to FIGS. 3 and 4, the auger 13 comprises helical blades driven by a reversible rotary electric motor (not shown) that is controlled by the main controller. The main controller may be connected to an optical sensor (not shown) for sensing the presence of a container below the nozzle 19 and a position sensor (not shown) for sensing actuation of the handle 18, whereby when both the presence of a container and actuation of the handle 18 are sensed, the motor is driven to turn the auger 13 so as to impel the product toward the dispensing assembly 17.

The speed of rotation of the auger 13, and its direction of rotation, is controlled by the main controller, according to the requirements of different modes of operation. At start-up the auger 13 impels the liquid product 35 toward the dispenser assembly 17. In this manner, the distal end 16 is always covered with agitated product 35, achieving efficient heat transfer and reduced freezing time even when the appliance 10 is used to make a single serving, when the auger 13 produces the standing wave illustrated to cover the distal end 16 even when the product level is low. Following start-up, a low product level mode may be established by the main controller (e.g. automatically by sensing liquid product level or by user input to the control panel 22) and in this mode the main controller actuates the motor to drive the auger 13 at a speed sufficient to produce the standing wave 36 when the product 35 to be frozen may otherwise only cover the bottom of the bowl 11. In addition to covering the distal end 16 in this way, the auger 13 scrapes frozen product from the cooling cylinder 12 and the direction that the product is impelled by the auger 13 assists with dispensing the product through the dispenser assembly 17.

For dispensing, the speed of the auger 13 is also modulated by the main controller to turn in a dispensing direction. Likewise, in a standby mode, when the main controller determines that the bowl is full of frozen product ready to dispense (as from feedback from a temperature sensor and current sensor responsive to motor torque), the main controller may maintain required viscosity of the product by regulating the temperature through control of the refrigeration circuit, and by turning the auger 13 in a direction opposite to the dispensing direction. In a mixing mode, the speed of the auger 13 is temporarily increased by the main controller to better mix ingredients.

The cooling cylinder 12 includes a cylinder wall portion 40 and end cap portion 41, which may be integrally formed, as from thin aluminium sheet for its thermal conductivity. The end cap portion 41 may be circular, closing the distal end 16. Immediately outside the cylinder wall portion 40 is the product to be frozen, while on the inside is the refrigerant, so the resistance to heat transfer is low and a good heat transfer rate can be achieved with only a small temperature difference. A divider member 42 cooperates with the cylinder wall portion 40 and end cap portion 41 to form contiguous evaporator compartments 43 to 47 that are axially spaced apart. The divider member 42 includes an axially elongate core 48 from which transversely extending annular flanges 49a to 49d project outward. The core 48 may be continuous and include therethough an axial refrigerant port 50. Seals, such as O-rings, may be received in a circumferential recess 51 in the edge of each flange 49a to 49d to provide a gas-tight seal with the cylindrical wall portion 40.

A proximal end evaporator compartment 47 is disposed at the proximal end 15 and is bounded externally by the cylindrical wall portion 40, and internally by the core 48 and flange 49d. To prevent "short circuiting" of the liquid refrigerant flow the refrigerant inlet and outlet are staggered transversely from one another, as in the evaporator compartment 47 where the refrigerant port 55 and restrictor passage 53d (both bisected by the diametrical plane of the section of FIG. 4) are disposed on opposite sides of the axis 14. The refrigerant port 55 may be formed in a closure assembly 56 releasably fixed to the proximal end 15.

A distal end evaporator compartment 43 is disposed at the distal end 16 and is bounded externally by the end cap portion 41 and an immediately adjacent length of the cylindrical wall 40, and internally by the core 48 and flange 49a. In the evaporator compartment 43 the refrigerant port 55 extends axially on the centerline and is staggered transversely from restrictor passage 53a.

The restrictor passages 53a-53d may be formed by recesses in the flanges 49a-49d, as in their peripheral edges, and have a cross-sectional area of between 80% and 120% of the cross-sectional area of that of the outlet ports 50.

Between the evaporator compartment 43 and 47 at the opposing ends may be three intermediate contiguous evaporator compartments 44 of like construction, but varying form. Evaporator compartment 44 is contiguous with compartment 43, axially spaced between the flanges 49a and 49b, and connected with compartment 43 via a restrictor passage 53a through the flange 49a. The inlet and outlet restrictor passages 53a and 53b may be diametrically opposing. The volume of compartment 44 may be between 1.3 and 1.7 times the volume of compartment 43, and is most preferably about 1.5 times the volume of compartment 43.

The ports 50 and 55 may provide refrigerant inlet and outlet respectively in the horizontal embodiment shown, where the restrictor passage 53a may be at the bottom of compartment 43. It has been observed that with this configuration the compartment 43 is largely flooded with liquid refrigerant before compartment 44 starts to fill. It is believed that choking of the restrictor passage 53a with refrigerant vapour may substantially prevent liquid refrigerant draining directly into compartment 44 in this situation.

Figure 5:
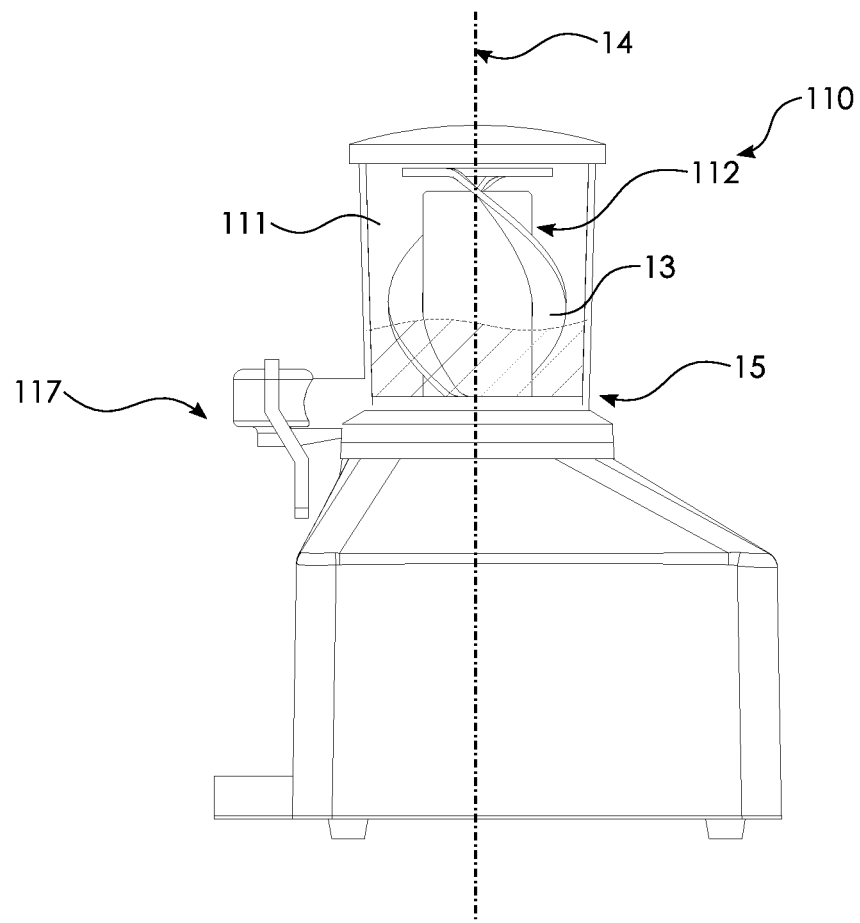
FIG. 5 is a side view of a second embodiment of the appliance of the invention.

The auger 13 may advantageously also be used with a cooling cylinder 112 in a second embodiment of the appliance 110 of the invention having a smaller footprint, as shown in FIG. 5. The outlet port for refrigerant (vapour) is larger in cross section than the inlet port for refrigerant (liquid) in both cooling cylinders 12, 112, so the only minor modification to cooling cylinder 12 is needed in order to accommodate this refrigerant flow reversal, specifically making the axial port 50 (now the outlet) larger than port 55 (now the inlet) to produce cooling cylinder 112. The cooling cylinder configuration thus provides a degree of modularity, reducing the number of different parts required to product the appliance range. In this appliance 110 the axis 14 is upright and the proximal end 15 is at the lower end of the bowl 111, adjacent the dispenser assembly 117. In this upright embodiment, the above-described refrigerant flow direction is reversed and the ports 50 and 55 provide refrigerant outlet and inlet respectively. The auger 13 impels the product toward the dispenser assembly during start-up and for dispensing, and this action is augmented by gravity.

In operation, the restrictor passages 53a-53d produce a multi-stage evaporator in which the evaporator compartments 43-47 tend to be flooded with liquid refrigerant sequentially from one axial end toward the other following start-up of the appliance 10, 110. In start-up of the appliance of the first (horizontal) embodiment the product is urged toward the distal end 16 by the auger 13 adjacent the compartment 43 first filled with liquid refrigerant. In start-up of the appliance of the second (upright) embodiment the product drains to the (lowermost) proximal end 15 adjacent the compartment 47 first filled with liquid refrigerant, so driving the auger 13 at start-up is not essential. Compared to old appliances of this type, this produces a reduced freeze time when starting from ambient temperature and making only a small batch of product, as both the heat transfer and the product to be frozen are initially concentrated at one axial end.

Figure 6:
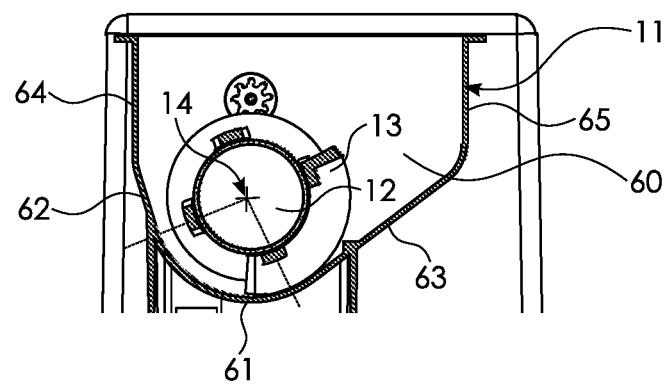
FIG. 6 is a transverse section through the bowl of the appliance of FIG. 1.

A further feature of the appliance of the invention is shown in FIG. 6 where, compared to old appliances of this type, the bowl 11 is shaped to form a product-receiving space 60 alongside the auger 13 and this can readily accommodate, for instance, any volume increase due to product aeration. In the old appliances the only product-receiving space not swept by the auger was directly above the auger, i.e. planar side walls of the bowl extended upright from a half-cylindrical base wall of complementary form to the auger so that the product-receiving space was limited to the sum of the half-annular volume swept by the auger below the horizontal plane through the axis of the cooling cylinder plus the space, between the sidewalls, immediately above this half-annular volume. However, the applicant has found that space 60 alongside the auger 13 can also be provided without compromising performance, and indeed it is believed that, due to the shearing action of the auger along the arcuate boundary of the space 60, the smoothness of the dispensed frozen product is superior compared to using the old bowl shape. As shown, rather than a half-cylindrical base wall (subtended by an angle of 180°), the cylindrical lowermost section 61 of the bowl 11 may be less than half-cylindrical subtended, for instance, by an angle of between 60° and 120° and most preferably of approximately 90° as shown in FIG. 6. Planar sidewalls 62 and 63 extend tangentially from opposite edges of the lowermost section 61, with the sidewall 62 inclined more steeply than sidewall 63, giving the bowl an asymmetric form wherein the greater part of the product-receiving space 60 alongside the auger 13 is adjacent sidewall 63. Planar sidewall sections 62 and 63 intersect with planar upright sidewall sections 64 and 65 respectively, which define the full width of the bowl 11.

Aspects of the present invention have been described by way of example only and it should be appreciated that modifications and additions may be made thereto without departing from the scope thereof.

The invention claimed is:

1. An appliance for producing frozen food products, comprising:
   a cooling cylinder connected in a refrigeration circuit, wherein
      the cooling cylinder has an axis, a proximal end, and a distal end opposing the proximal end,
      the cooling cylinder includes a cylinder wall portion and an end cap portion, closing the distal end of the cylinder wall portion, and
      the cylinder wall portion and the end cap portion are thermally conductive and separate a product to be frozen on a first side of the cylinder wall portion from a refrigerant located on a second side of the cylinder wall portion;
   a nozzle located adjacent one of the proximal and distal ends of the cooling cylinder for dispensing the product;
   an auger disposed adjacent the first side of the cylinder wall portion to turn about the axis of the cooling cylinder and scrape frozen product from the cooling cylinder;
   an electric motor for rotating the auger;
   a main controller that controls actuation of the electric motor and, for dispensing, drives the auger to impel the product toward the nozzle;
   a divider member disposed adjacent the second side of the cylinder wall portion and forming contiguous evaporator compartments, wherein
      the evaporator compartments are spaced apart axially by transversely extending parts of the divider member disposed in sealing engagement with the cylinder wall portion,
      the divider comprises an elongate core from which the transversely extending parts project outward, and
      the elongate core is continuous;
   restrictor passages in the divider member permitting communication between contiguous evaporator compartments; and
   refrigerant ports in the evaporator compartments at proximal and distal ends of the divider member, arranged so that refrigerant first enters the evaporator compartment at one of the proximal and distal ends of the divider member and flows serially between the evaporator compartments, wherein one of the refrigerant ports is axially elongated and extends through the elongate core connecting the evaporator compartment adjacent the end cap portion to the proximal end of the cooling cylinder for refrigerant supply or return.

2. The appliance of claim 1, wherein
   the restrictor passages extend substantially axially through the transversely extending parts, and
   the refrigerant inlet and outlet of each evaporator compartment are staggered transversely from one another.

3. The appliance of claim 2, wherein,
   in intermediate ones of the evaporator compartments, located between the evaporator compartments at the proximal and distal ends of the divider member, the transversely extending parts bound axially opposing ends of each of the intermediate evaporator compartments, and
   the restrictor passages in inlet and outlet sides of each evaporator compartment are diametrically opposing.

4. The appliance of claim 1, wherein the one of refrigerant ports that is axially elongated provides an inlet and refrigerant is precooled at the refrigerant port that is axially elongated.

5. An appliance for producing frozen food products, comprising:
   a cooling cylinder connected in a refrigeration circuit, wherein
      the cooling cylinder has an axis, a proximal end, and a distal end opposing the proximal end,
      the axis of the cooling cylinder is substantially horizontal or inclined such that the distal end of the cooling cylinder is lowermost,
      the cooling cylinder includes a cylinder wall portion and an end cap portion, closing the distal end of the cylinder wall portion, and
      the cylinder wall portion and the end cap portion are thermally conductive and separate a product to be frozen on a first side of the cylinder wall portion from a refrigerant located on a second side of the cylinder wall portion;
   a nozzle for dispensing the product, wherein the distal end of the cooling cylinder is adjacent the nozzle;
   an auger disposed adjacent the first side of the cylinder wall portion to turn about the axis of the cooling cylinder and scrape frozen product from the cooling cylinder;
   an electric motor for rotating the auger;
   a main controller that controls actuation of the electric motor and, for dispensing, drives the auger to impel the product toward the nozzle;
   a divider member disposed adjacent the second side of the cylinder wall portion and forming contiguous evaporator compartments, wherein the evaporator compartments are spaced apart axially by transversely extending parts of the divider member disposed in sealing engagement with the cylinder wall portion;
   restrictor passages in the divider member permitting communication between contiguous evaporator compartments; and
   refrigerant ports in the evaporator compartments at proximal and distal ends of the divider member, arranged so that refrigerant first enters the evaporator compartment at one of the proximal and distal ends of the divider member and flows serially between the evaporator compartments and, at start-up of the appliance, the main controller turns the auger to urge the product toward the distal end of the cooling cylinder, and the evaporator compartment at the distal end of the divider is first filled with liquid refrigerant.

6. The appliance of claim 5, further comprising a bowl for holding the product, wherein
   the cooling cylinder projects into the bowl, and
   the cylinder wall portion and the end cap portion are outermost.

7. The appliance of claim 6, wherein
   the bowl includes a lowermost section of part-cylindrical form, complementary to the auger, and subtended by an angle of between 60° and 120°, and
   opposite edges of the lowermost section are joined to planar sidewall sections that extend tangentially and define a product-receiving space alongside both sides of the auger.

8. The appliance of claim 5, wherein
the evaporator compartments have respective volumes, and
a ratio of the volume of a second of the evaporator compartments to the volume of the evaporator compartment that the refrigerant first enters is between 1.3 and 1.7.

9. The appliance of claim 8, wherein the ratio is about 1.5.

10. The appliance of claim 5, wherein
the restrictor passage and the refrigerant port at the outlet of the cooling cylinder have respective a cross-sectional areas, and
the cross-sectional area of the restrictor passage is between 80% and 120% of the cross-sectional area of the refrigerant port at the outlet of the cooling cylinder.

11. The appliance of claim 5, wherein
the restrictor passages extend substantially axially through the transversely extending parts, and
the refrigerant inlet and outlet of each evaporator compartment are staggered transversely from one another.

12. The appliance of claim 11, wherein,
in intermediate ones of the evaporator compartments, located between the evaporator compartments at the proximal and distal ends of the divider member, the transversely extending parts bound axially opposing ends of each of the intermediate evaporator compartments, and
the restrictor passages in inlet and outlet sides of each evaporator compartment are diametrically opposing.

13. An appliance for producing frozen food products, comprising:
a cooling cylinder connected in a refrigeration circuit, wherein
the cooling cylinder has an axis, a proximal end, and a distal end opposing the proximal end,
the axis of the cooling cylinder is substantially upright,
the proximal end of the cooling cylinder is lowermost,
the cooling cylinder includes a cylinder wall portion and an end cap portion, closing the distal end of the cylinder wall portion, and
the cylinder wall portion and the end cap portion are thermally conductive and separate a product to be frozen on a first side of the cylinder wall portion from a refrigerant located on a second side of the cylinder wall portion;
a nozzle for dispensing the product, wherein the proximal end of the cooling cylinder is adjacent the nozzle;
an auger disposed adjacent the first side of the cylinder wall portion to turn about the axis of the cooling cylinder and scrape frozen product from the cooling cylinder;
an electric motor for rotating the auger;
a main controller that controls actuation of the electric motor and, for dispensing, drives the auger to impel the product toward the nozzle;
a divider member disposed adjacent the second side of the cylinder wall portion and forming contiguous evaporator compartments, wherein the evaporator compartments are spaced apart axially by transversely extending parts of the divider member disposed in sealing engagement with the cylinder wall portion, and
the evaporator compartment at the proximal end of the divider member is first filled with liquid refrigerant;
restrictor passages in the divider member permitting communication between contiguous evaporator compartments, and
refrigerant ports in the evaporator compartments at proximal and distal ends of the divider member, arranged so that refrigerant first enters the evaporator compartment at one of the proximal and distal ends of the divider member and flows serially between the evaporator compartments.

14. The appliance of claim 13, further comprising a bowl for holding the product, wherein
the cooling cylinder projects into the bowl, and
the cylinder wall portion and the end cap portion are outermost.

15. The appliance of claim 14, wherein
the bowl includes a lowermost section of part-cylindrical form, complementary to the auger, and subtended by an angle of between 60° and 120°, and
opposite edges of the lowermost section are joined to planar sidewall sections that extend tangentially and define a product-receiving space alongside both sides of the auger.

16. The appliance of claim 13, wherein
the restrictor passages extend substantially axially through the transversely extending parts, and
the refrigerant inlet and outlet of each evaporator compartment are staggered transversely from one another.

17. The appliance of claim 16, wherein,
in intermediate ones of the evaporator compartments, located between the evaporator compartments at the proximal and distal ends of the divider member, the transversely extending parts bound axially opposing ends of each of the intermediate evaporator compartments, and
the restrictor passages in inlet and outlet sides of each evaporator compartment are diametrically opposing.

18. The appliance of claim 13, wherein
the evaporator compartments have respective volumes, and
a ratio of the volume of a second of the evaporator compartments to the volume of the evaporator compartment that the refrigerant first enters is between 1.3 and 1.7.

19. The appliance of claim 18, wherein the ratio is about 1.5.

20. The appliance of claim 13, wherein
the restrictor passage and the refrigerant port at the outlet of the cooling cylinder have respective a cross-sectional areas, and
the cross-sectional area of the restrictor passage is between 80% and 120% of the cross-sectional area of the refrigerant port at the outlet of the cooling cylinder.

* * * * *